United States Patent [19]

Von Stetten

[11] 4,285,037
[45] Aug. 18, 1981

[54] CIRCUIT ARRANGEMENT FOR A SWITCHING SYSTEM

[75] Inventor: Hanns N. Von Stetten, Soecking, Fed. Rep. of Germany

[73] Assignee: Siemens Aktiengesellschaft, Berlin & Munich, Fed. Rep. of Germany

[21] Appl. No.: 37,506

[22] Filed: May 9, 1979

[30] Foreign Application Priority Data

Jun. 21, 1978 [DE] Fed. Rep. of Germany ....... 2827270

[51] Int. Cl.³ ............................................. G06F 15/16
[52] U.S. Cl. .................................................. 364/200
[58] Field of Search ... 364/200 MS File, 900 MS File; 179/15 W, 18 F, 18 J

[56] References Cited

U.S. PATENT DOCUMENTS

| | | | |
|---|---|---|---|
| 3,735,365 | 5/1973 | Nakamura et al. | 364/200 |
| 3,771,135 | 11/1973 | Huettner et al. | 364/200 |
| 3,815,095 | 6/1974 | Wester | 364/200 |
| 4,015,246 | 3/1977 | Hopkins, Jr. et al. | 364/200 |
| 4,044,333 | 8/1977 | Auspurg et al. | 364/200 |
| 4,096,571 | 6/1978 | Vander Mey | 364/200 |

*Primary Examiner*—Gareth D. Shaw
*Assistant Examiner*—Thomas M. Heckler

*Attorney, Agent, or Firm*—Hill, Van Santen, Steadman, Chiara & Simpson

[57] ABSTRACT

A circuit arrangement for a switching system having microprocessors for decentralized execution of switch-oriented jobs is provided wherein a separate microprocessor, autonomously functional for its jobs, is provided in a network level for the connection of a respective class of connection lines with specific and identical transmission properties and in a switching level for the connection of devices respectively provided for executing specific and identical switching tasks and services. All microprocessors are connected with one another by way of a common data bus, whereby the transmission of messages in the transmitting and receiving directions between the microprocessors occurs in the form of information blocks provided with address information. A central clock pulse is provided, under whose control only one respective microprocessor is cyclically connectible for the transmission of an information block and all other microprocessors are connectible to the common data bus for the reception of an information block. Each microprocessor receives an information block only upon the presence of an address intended for the connection lines or devices connected to the microprocessor concerned.

8 Claims, 7 Drawing Figures

CIRCUIT ARRANGEMENT FOR A SWITCHING SYSTEM

BACKGROUND OF THE INVENTION

1. Field of the Invention

The present invention relates to a circuit arrangement for a switching system having microprocessors for decentralized execution of switch-oriented tasks.

2. Description of the Prior Art

In the construction of telegraph switching systems, one has heretofore pursued the path of a greatest possible centralization. This development was encouraged by the construction of computer-controlled switching systems. However, with the increasing size of a switching system, the sequences required for the execution of all switch-oriented tasks becomes more and more complex and not surveyable. The sequences are only capable of being governed with a very extensive programming expense. As an example, one problem which arises is the observance of the real time requirements which are absolutely necessary for the execution of switch-oriented tasks and which is usually solved in traditional centrally-controlled systems with the assistance of interrupt procedures. By so doing, blocking situations arise at peak loads which are only capable of being governed with a great expense. Also, in view of the multiplicity of lines to be connected to a switching system operating with various transmission processes and with various transmission speeds and codes, problems occur in a centrally-controlled system, above all, because with a change of the connections, a reconfiguration of the entire system structure is also required at the same time.

With the development of microprocessors, a cost-effective component has been made available which is easily programmable and, therefore, is suitable for a multiple employment without special expense.

SUMMARY OF THE INVENTION

The object of the present invention, therefore, is to provide a switching system which, utilizing known microprocessors, allows a very flexible adaptation to various cases of application, whereby the disadvantages of a very complex program structure occurring in a centrally-controlled switching system are avoided. Above all, it is a particular object of the invention to create a switching system which does justice to the demands of a variety of different users having constantly changing requirements without performing extensive operations on the switching system structure and without great developmental expense.

The above object is achieved, according to the present invention, in that a respective microprocessor which is autonomously operational for its tasks is provided in a network level for the connection of a respective class of connection lines with specific and identical transmission properties and in a switching level for the connection of devices respectively provided for the execution of specific and identical switching jobs and services. All microprocessors are connected with one another via a common data bus, whereby the transmission of messages in the transmitting and receiving directions occurs between the microprocessors in the form of information blocks having address information. A central clock is provided under whose control only a respective microprocessor is cyclically connectible for the emission of an information block and all other microprocessors are connectible to the common data bus for receiving an information block. Each microprocessor receives an information block only given in the presence of an address specified for the connection lines or devices connected to the relevant microprocessor.

A switching system having these features, because of the consistent decentralization, exhibits the advantage that the microprocessors provided on the network level for the connection of the various lines can be employed, according to the principle of low distribution, and the microprocessor provided for the execution of switch-oriented tasks on the switching level can be employed according to the principle of function distribution. The terms network level and switching level here serve only for the elucidation of the system's manner of operation, within which each of the individual microprocessors functions as an independent unit. Thereby, not only does the construction of the switching system become clear and, therefore, a servicing during operation become more simple, but, rather, substantially more favorable and more simple possibilities for a later alteration or augmentation of the switching system are derived in comparison to centralized systems. Therefore, it is very easy to connect the lines to the system on which one works with various transmission procedures and various transmission speeds, as well as to enlarge the switching system with respect to further additional services which go beyond the usual switch-oriented functions. In both cases, one needs only to employ further decentralized processing units, i.e. further microprocessors.

With respect to security against failure, also, advantages are derived with the arrangement constructed in accordance with the present invention, insofar as the failure of one or more microprocessors is always expressed only in a functional limitation. In such a case, only the lines or devices connected to the faulty microprocessor or microprocessors are respectively not available for communication. The remaining, intact, system, however, remains completely functional.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
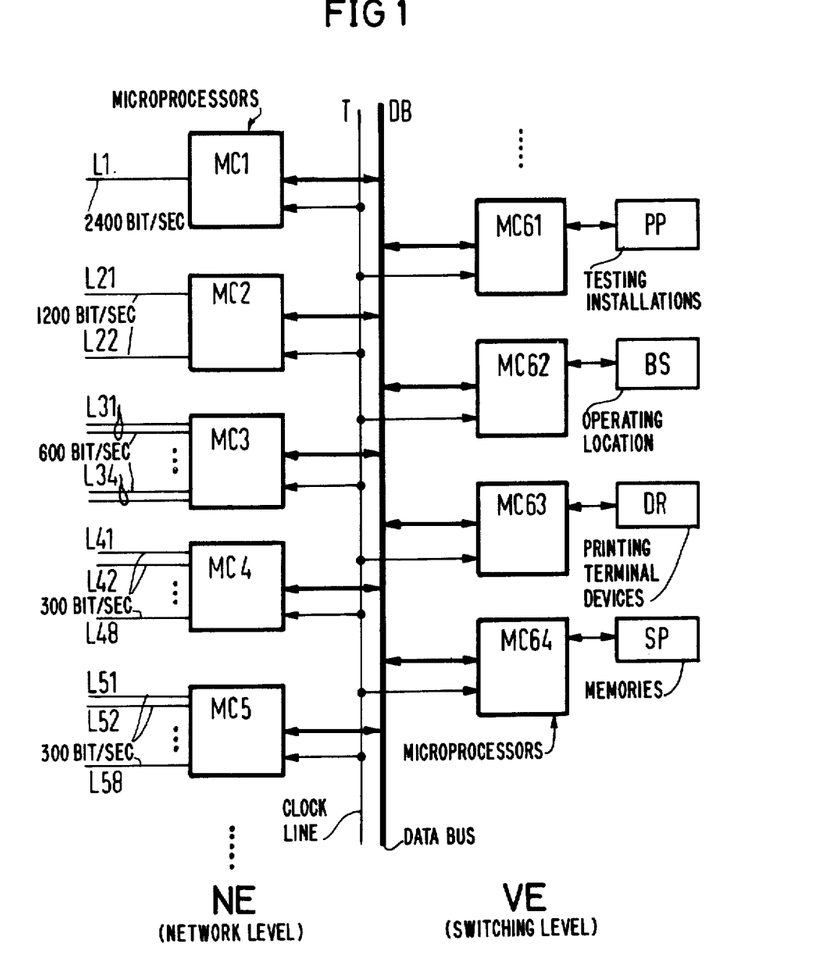
FIG. 1 is an exemplary block diagram representation of a switching system constructed in accordance with the present invention.

The exemplary embodiment illustrated in FIG. 1 exhibits a respective series of microprocessors in a network level NE and in a switching level VE. In the exemplary embodiment illustrated in FIG. 1, a total of 64 microprocessors MC1-MC64 is illustrated, of which the illustrated microprocessors MC1-MC5 serve for the connection of lines and the illustrated microprocessors MC61-MC64 serve for the connection of installations which are provided for executing specific switching tasks and services. All of the microprocessors MC1-MC64 are connected to a common data bus DB. Each microprocessor MC1-MC64 forms an independent decentralized processing unit, to which either lines of a specific class that are identical with regard to transmission type and transmission speed are connected, as is the case for the microprocessors MC1-MC5, or to which installations for executing respective identical tasks and services are connected, as is the case for the microprocessors MC61-MC64. In the exemplary embodiment illustrated in FIG. 1, a line L1 having a transmission speed of 2400 bit/sec. is connected to the microprocessor MC1, two lines L21 and L22 having a transmission speed of, respectively, 1200 bit/sec. are connected to the microprocessor MC2, four lines L31-L34 are connected for a transmission speed of 600 bit/sec. to the microprocessor MC3 and eight lines L41-L48 and, respectively, L51-L58 having a transmission speed of 300 bit/sec. are respectively connected to the microprocessors MC4 and MC5.

The microprocessors which are connected in the switching level VE, the microprocessors MC61-MC64 in the exemplary embodiment, respectively represent control modules for testing installations PP for system testing, for installation of an operating location BS, for the connection of printing terminal devices DR and for the connection of one or more further memories SP. As required, the number of the microprocessors provided in the switching level VE can be increased by the addition of further microprocessors.

Each of the microprocessors MC1-MC64 contains the program information required for its specific tasks, which information, however, because of the respectively narrowly limited functions which are to be executed by a microprocessor independently of the activity of other microprocessors, are substantially more simple both with respect to their number, as well as with respect to their complexity than in centrally-controlled systems.

The cooperation of the individual microprocessors occurs by way of the common data bus DB upon control of a central clock pulse T. This cooperation occurs in such a manner that, in a cyclical sequence, respectively only one microprocessor transmits an information block by way of the data bus which all other microprocessors receive at the same time. Because of the addresses allocated to each information block transmitted on the data bus, by means of comparison in the receiving microprocessors with the address information stored therein, respectively only those information blocks are received and stored which are intended for the microprocessors concerned, i.e. which can be relayed via a particular microprocessor. Thereby, an information block can contain message and/or signaling characters. The length of an information block depends on the properties of the microprocessors employed. For a practical application, block lengths, of, for example, 512 byte or of 1024 byte can be transmitted with available microprocessors within the time available for the transmission or, respectively, for the reception of information via the common data bus DB. The formation of an information block respectively occurs in the individual microprocessors. In the case of microprocessors to which lines are connected, the formation of an individual information block occurs by means of character-wise collection and intermediate storage of the characters arriving on the lines. The formation of a block address, as well as the allocation of incoming message characters to the message characters already present with the corresponding addresses occurs in the microprocessor on the basis of the program information present therein.

As will be explained in greater detail below on the basis of FIGS. 2 and 3, this occurs upon control of the central block pulse T in the frame of a module cycle which guarantees that a sufficient time span is available to such end. Upon each call of a microprocessor for transmission on the data bus DB, the content of the respective full cell of the microprocessor internal intermediate memory is transmitted, whose content corresponds to the length of an information block.

The decentralized arrangement of the microprocessors as respectively independently-functioning units, which are cyclically switchable in the frame of a systems cycle from a transmission state to a reception state makes it possible to receive an information block transmitted over the data bus DB in parallel at all microprocessors functioning as receivers, and to there select, by designation, only the respective information blocks intended for a respective microprocessor by means of a simple comparison process. Only these information blocks are stored, block-wise, and later transferred, character-wise, into output buffers upon control of the module cycle and transmitted by way of a specific outgoing line. These sequences, arranged in cycles of equal time duration, together with the decentralized arrangement of the microprocessors, guarantee a timely switching of arriving connection requests and messages which does justice to all occurring real-time requirements.

In a development of the invention, one or more overflow memories can be provided which, corresponding to the concept stated above, are likewise realized by means of microprocessors having additional memories allocated thereto. In the exemplary embodiment illustrated in FIG. 1, this is the microprocessor MC64 having the memory SP. It is advantageous to receive and temporarily store all information blocks transmitted over the data bus DB at the overflow memory. This offers the possibility of being able to refer back to these information in specific cases. As an example, let the busy line be of particular concern. This case exists when an information block transmitted over the data bus DB is recognized in a receiving microprocessor as an information block intended for this location on the basis of a positive address evaluation, but no free memory location is available for accepting the information block. Since the microprocessor MC64 of the overflow location, just like all other microprocessors of the switching system, is arranged in the cyclical transmitting and receiving rhythm, and therefore functions within each system cycle at least once as a transmitter, this information block can be repeatedly transmitted, for example, until the microprocessor intended as a receiver can take over the information block.

The manner of operation of the switching system illustrated in FIG. 1 will now be explained in detail on the basis of the timing charts illustrated in FIGS. 2 and 3.

Given the assumption that 64 microprocessors are connected to the common data bus DB, upon control of the central clock pulse T with the block pulse phases T1-T64 of a system cycle SZY, respective microprocessors MC1-MC64 are cyclically switched as transmitters and all other 63, at the same instant, are connected as receivers. During the clock pulse phase T1, for example, the microprocessor MC1 is connected as a transmitter (S in FIG. 2), whereas the microprocessors MC2-MC64 function as receivers (E in FIG. 2). During the clock pulse phase T2, only the microprocessor MC2 functions as a transmitter, whereas the microprocessor MC1 and the microprocessor MC3-MC64 function as receivers. Finally, during the clock pulse phase T64, the microprocessor MC64 is connected as a transmitter and the microprocessors MC1-MC63 are connected as receivers. During this clock pulse phase, then, the message is contained in the overflow memory allocated to the microprocessor MC64 are transmitted on the common data bus. In FIG. 2, this process has been respectively characterized by means of the designation S for the transmitting state and E for the receiving state. During each transmitting process S, the microprocessor concerned transmits an information block of, for example, 512 or 1024 byte on the common data bus DB. This is then simultaneously received, in parallel, by all microprocessors which are in the receiving state E. Within each time span lying between two clock pulses T1-T64, of the central clock pulse T, further processes cycle in each microprocessor MC1-MC64, in addition to the transmitting process or, respectively, the receiving process. Thereby, it is matter of the input-/output of information from the connected lines or, respectively, onto the connected lines, or from connected external terminal devices or, respectively, to external terminal devices. In FIG. 2, the designation E/A has been selected for this purpose. Further, a sufficient processing time VEZT is available during which a microprocessor handles its internal operations. Thereby, as already mentioned above, it is a matter of, among other things, the address formation, the allocation of arriving information or information to be transmitted, the formation of control criteria in the direction to the network level and to the switching level, as well as other program sequences. The control of these processes occurs within a module cycle MZY in synchronism with the central clock pulse T. In FIG. 2, the clock pulse phases of the module cycles are designated with t0-t1536. For an explanation of these processes in greater detail, one must refer to FIG. 3. A time realm of the module cycle MZY1 with the clock pulses t0-t24 lying between the clock pulse phases T1 and T2 of a system cycle SZY is illustrated in FIG. 3. To this end, it is assumed that the microprocessors MC1-MC64 employed in the exemplary embodiment respectively contain eight character buffers which are occasioned with each third clock pulses t0, t3, t6, etc-t21 to transfer an information contained therein into the memory of the microprocessor or, respectively, to transfer an information out of such memory. These processes, which represent an input/output operation, have again been designated E/A. Between the clock pulses t1 and t3, all microprocessors MC1-MC64 are connected to the common data bus, whereby the microprocessor MC1 operates as a transmitter (S in FIG. 3) and the microprocessors MC2-MC64 operate as receivers (E in FIG. 3). With the exception of the time duration required for the execution of input and output operations E/A, the remaining time of the module cycle MZY1 is available for the execution of sequences in the microprocessor. In FIG. 3, this time has been referenced VEZT (processing time).

In a development of the invention, there is also the possiblity of switching the microprocessor working together with the overflow memory, the microprocessor MC64 in the exemplary embodiment illustrated in FIG. 1, as a transmitter once in each clock pulse phase T1-T64 of the system cycle SZY and connecting all other microprocessors MC1-MC63 as receivers. This development offers advantages when, in a switching system of the type described herein, frequent demands are made for the transfer of information blocks out of the overflow memory. In FIG. 3, this possibility is illustrated with broken lines, whereby the example illustrates that the microprocessor MC64 transmits an information block with the clock pulse t22 in the module cycle MZY1 which all other microprocessors MC1-MC63 receive. In a manner not illustrated here, this process can then be repeated during each module cycle.

Figure 2:
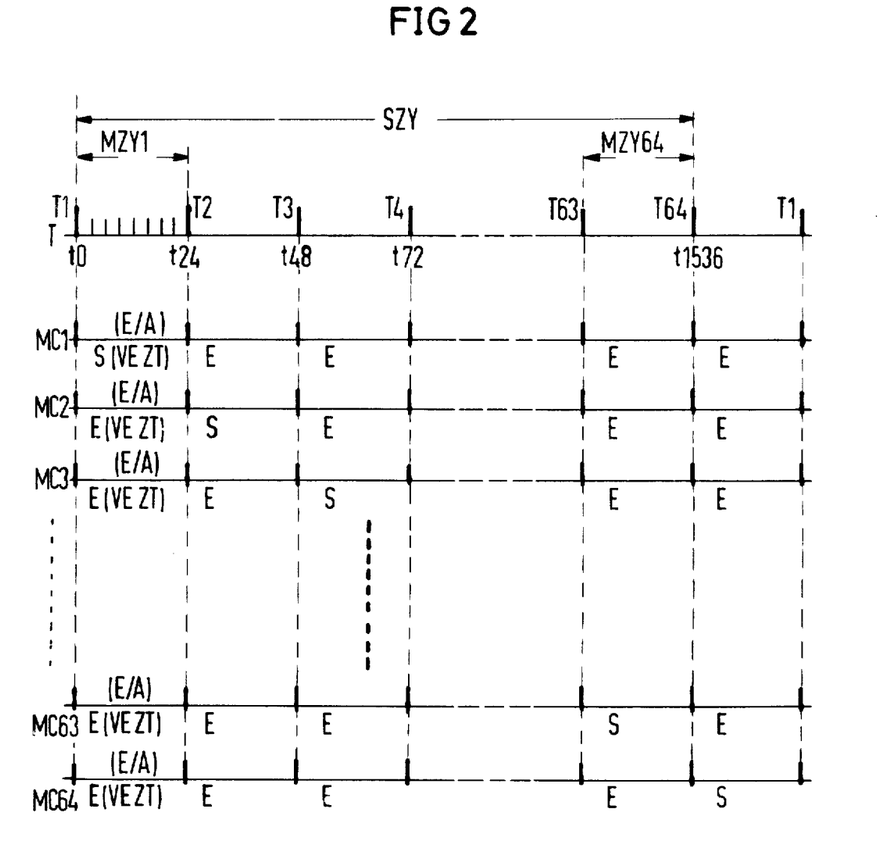
FIG. 2 is a timing chart for explaining the basic manner of operation of the arrangement illustrated in FIG. 1.
Figure 3:
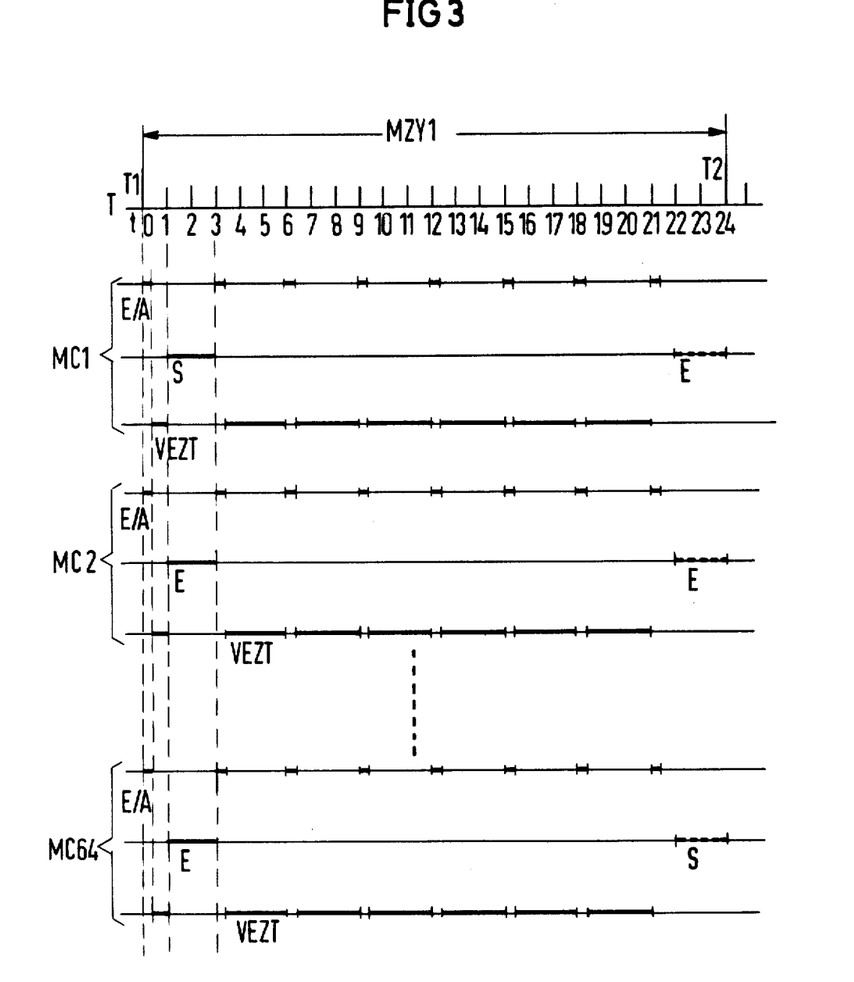
FIG. 3 is another timing chart to aid in explaining the manner of operation of the arrangement illustrated in FIG. 1.

The time-slot pattern for a system cycle and for a module cycle, illustrated in FIG. 2 and in FIG. 3, is determined, on the one hand, by the maximum number of connected microprocessors and, on the other hand, by the maximum number of lines or channels connected to a microprocessor, as well as the transmission speed with which one operates on these lines. Given the assumption that, for example, the switching system is rendered possible the loss-free servicing of eight lines with a maximum 300 bit/sec. transmission speed, upon employment of a known microprocessor having two independent eight-bit buffer memories per line, there occurs the duration of a module cycle MZY1-MZY64 of 24 ms. Referring to the presentation in FIG. 3, this means that each of the buffers in the microprocessor is called for input or for output of information every 3 ms. Given this assumption, and with the time of 100 µs required for known microprocessors for the input and the output of an eight-bit information, and available free time of 2.9 ms remains between three clock pulses of a module cycle MZY1-MZY64, respectively. The connection of the microprocessors to the data bus DB occurs during one of these time intervals. Thereby, a respective microprocessor transmits an information block which is received by all other microprocessors. The remaining time intervals are available as processing times VEZT for the handling of internal processes in the microprocessors. Based on the output parameters mentioned above, therefore, all microprocessors are simultaneously connected to the common data bus DB for a duration of 2 ms in the sequence of 24 ms, whereby only one is always respectively transmitting and all others are receiving. Given the above conditions, the time duration for a module cycle MZY1-MZY64 then amounts to 24 ms and that for a system cycle SZY amounts to 1536 ms. This means that, given a transmission rate by way of the data bus of 512 byte per cycle, a message volume of 333 byte per second can be supplied to or delivered from the microprocessor.

The timely connection, as well as the transfer from the receiving state to the transmitting state of the individual microprocessors MC1-MC64, is achieved, on the one hand, by means of the central clock pulse T and, on the other hand, by means of a connection counter provided in each microprocessor whose count is cyclically offset in the individual microprocessors. The initial count, for example, can be stored in the form of a constant in a memory of the microprocessor. The count of the individual counter in each microprocessor can always be reloaded with the individual initial value in one of the module cycles, for example, in the 64$^{th}$ module cycle. The cyclically-offset manner of operation makes an address bus for the individual microprocessors superfluous.

Figure 4:
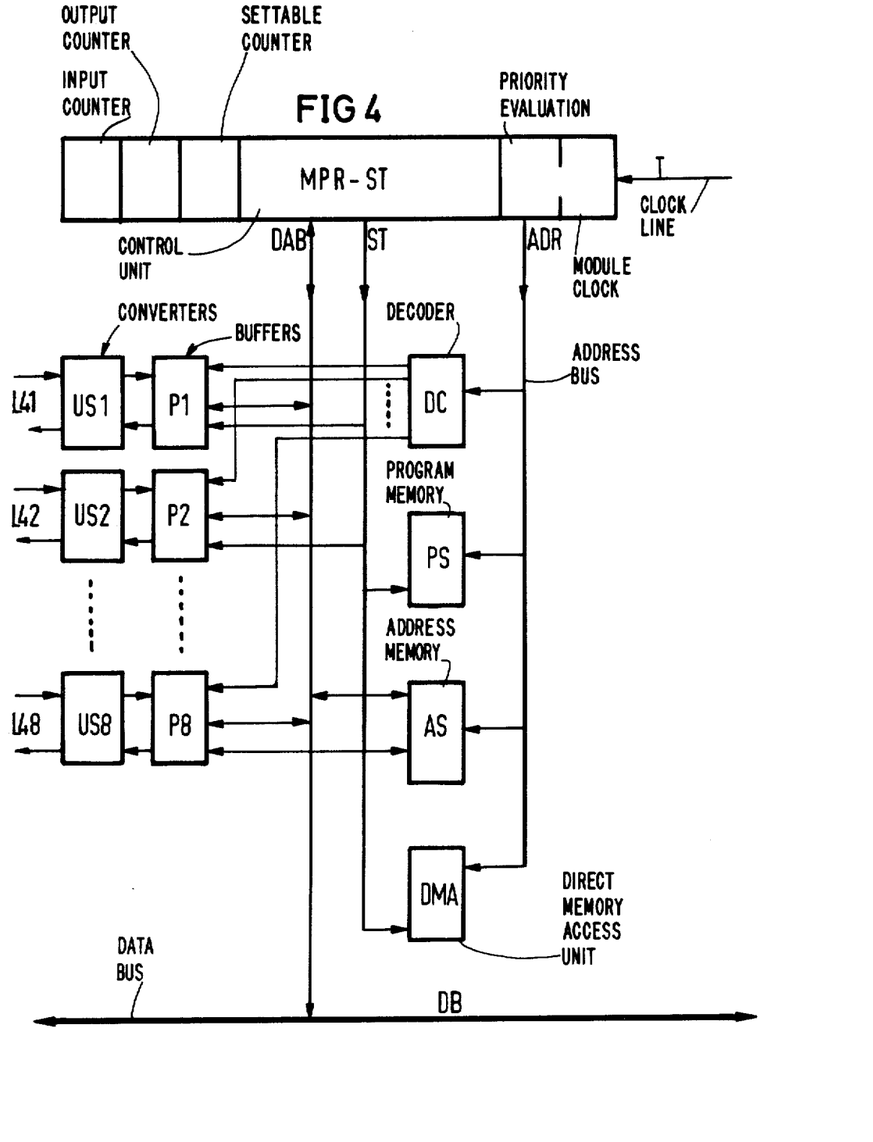
FIG. 4 is a schematic representation of the basic construction of a microprocessor having eight lines connected thereto.

The above manner of operation will be explained again on the basis of a basic circuit diagram for a microprocessor, as illustrated in FIG. 4. In FIG. 4, a control unit MPR-ST of the microprocessor receives a central clock pulse T. The individual lines, that is the eight lines L41-L48 in this example are respectively connected to converter circuits US1-US8 to which a respective buffer P1-P8 is connected for receiving an eight-bit character. By means of evaluation of the clock pulses of the module cycle derived from the central clock pulse T, the individual buffers P1-P8 are connected for the delivery of an eight-bit information by way of a decoder DC to the internal data bus DB over which the data then arrive in the memory of the microprocessor. For the output of data, the data are transmitted from the memory of the microprocessor into the individual buffers P1-P8 in the same manner. The microprocessor further comprises a program memory PS, as well as an address memory AS, in which the address is allocated to the outgoing lines are stored, by means of which the information blocks received over the data bus DB are recognized as information blocks which are valid for the microprocessor concerned. A further installation DMA controls the direct memory access to the memory of the microprocessor. Under the control of this installation, a respective information block of, for example, 512 or 1024 byte is transmitted on the central, common data bus DB for all microprocessors during the transmission phase of the microprocessor. The decoder DC, the program memory PS and the address memory AS, as well as the installation for the direct memory access DMA are respectively connected to an internal address bus ADR. As a rule, the storage capacity of 8 kilobyte is sufficient for the memory of a microprocessor for receiving information blocks in order to decentrally intercept a message back-up which may occur.

Figure 5:
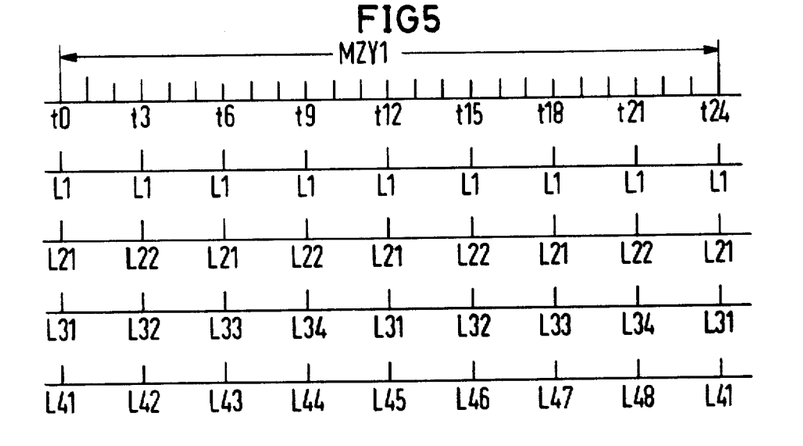
FIG. 5 is an exemplary sequence chart illustrating the scanning sequences upon connection of lines of varying transmission speeds.

The above example is based on a transmission speed of 300 bit/sec. For the case in which lines or terminal devices having a higher transmission speed are connected to a microprocessor, the plurality of the connected lines is to be correspondingly reduced. The buffers of a microprocessor provided for the connection of such lines are then correspondingly more frequently serviced within a module cycle, corresponding to the transmission speed. An example, illustrated in FIG. 5, shows that the line L1 which is working at a transmission speed of 2400 bit/sec. is serviced eight times during the module cycle MZY1, the lines L21 and L22, working at transmission speeds of 1200 bit/sec. are serviced four times during an identical time span, the lines L31 and L34 are serviced twice during this time span and the lines L41-L48 are served only once during an identical time span.

Figure 6:
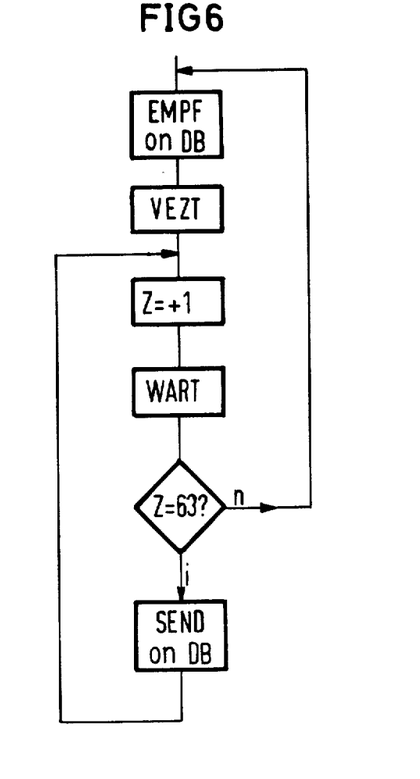
FIG. 6 is a flow chart illustrating the cyclical connection of the microprocessors working as transmitters and receivers.

As has already been mentioned above, each of the microprocessors connected to the common data bus DB is respectively connected only once during a system cycle for transmission and 63 times for receiving an information block. The connection at the proper time, as well as the transfer from transmitting to receiving, as has already been pointed out above, is achieved by means of the synchronization of the central clock pulse and a counter provided in each microprocessor, the initial count being individually set for each microprocessor and being cyclically offset from microprocessor-to-microprocessor. This procedure is illustrated in FIG. 6 in the form of a flow chart. The presentation holds true as an example for the microprocessor MC63. At each of the clock pulse phases T1-T64 of a system cycle SZY illustrated in FIG. 2, the microprocessor MC63 is connected to the common data bus DB, whereby it either functions as a receiver or as a transmitter, depending on the state of its counter. As long as the individual counter reading, here set at the value of Z=63, has not been achieved, a respective information block of, for example, 512 byte is received. In detail, it is a matter of the following processes. The processing time VEZT described on the basis of FIG. 3 follows upon the reception of an information block (EMPF on DB), which is terminated, for example, after 2 ms. Thereby, on the basis of the internal sequences not illustrated here, the evaluation program provided in the microprocessor decides whether or not the received information block is intended for the microprocessor concerned or, respectively, for the lines connected thereto. In a manner likewise not illustrated, input and output operations or, respectively, classification and storage processes are executed. At the same time, the counter state of the microprocessor's individual counter is increased by one (Z=1). As was described with respect to FIG. 3, a waiting time (WART) of, for example, 22 ms is available to the microprocessor until the beginning of the next clock pulse phase of the system cycle. After the end of this waiting time, the count of the individual counter is checked (Z=63?) and, in the case of a lack of coincidence, the information block arriving at the next clock pulse phase is again received. If, on the other hand, the individually-set count of the counter is reached, for example Z=63, then the microprocessor is transferred to a transmission load. During the next clock pulse phase of the system cycle, with the beginning of the clock pulse phase T63 in the example, an information block is not transmitted onto the data bus DB (SEND on DB). A separate system address bus is not required because of the offset of the count from microprocessor-to-microprocessor.

Figure 7:
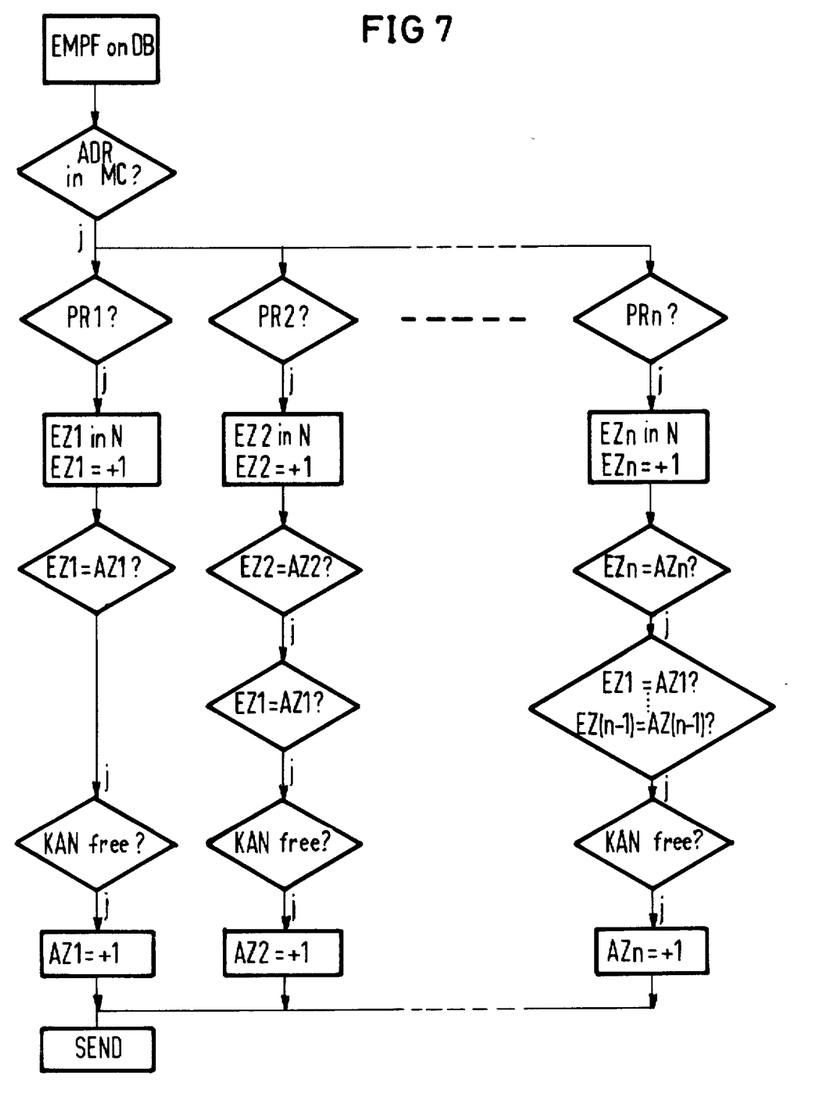
FIG. 7 is a flow chart illustrating a sequence of priority-dependent switching of messages.

In a particular development of the invention, it is also possible to guarantee a priority-dependent switching of messages. To this end, it is only required that the message is transmitted over the data bus as information blocks be provided with a priority characterization and that two counters for each output direction are assigned to each microprocessor per priority. Since the first of these counters is changed upon input of an information block over the data bus and the other is changed upon transmission of the message, it is advantageous to speak of an input counter and of an output counter per priority class. In order to better explain the manner of operation of a priority-dependent switching process, reference is made to FIG. 7. The flow chart of FIG. 7 is based on the provision of n priority classes for a specific microprocessor, whereby the input counter EZ1 and the output counter AZ1 are assigned to the first priority class PR1, the input counter EZ2 and the output counter AZ2 are assigned to the second priority class PR2, and the input counter EZn and the output counter AZn are allocated to the $n^{th}$ priority class PRn. An information block received over the data bus (EMPF on DB) is first checked to see whether the message is intended for the microprocessor concerned (ADR in MC?). When such is the case, and it is a matter, for example, of a message of the priority class PR1, then the current count of the input counter EZ1 is transferred into the address information of the message (EZ1 in N). At the same time, the input counter EZ1 has its count increased by one (EZ1+1). By comparing the count of the input counter with the count of the output counter, the number of pending messages is determined (EZ1=AZ1?) and, at the same time, the current transmission time is ascertained.

This exists when both counts coincide. When a free, outgoing channel is present (KAN free?) in this case, then the message is transmitted upon an increase of the count of the output counter (AZ=1). For messages of the lower priority classes PR2-PRn, a further comparison respectively occurs by means of which it is determined whether messages of higher priority exists. This process takes place in such a manner that a comparison of the counts of the input and output counters assigned to all higher-value priority classes is incorporated in this sequence. As illustrated in FIG. 7, for example, in the case of a message assigned to the priority class PR2, a comparison of the counts of the input and output counters EZ1 and AZ1 assigned to the higher priority class PR1 also occurs in addition to a comparison of the counts of the input and output counters EZ2 and AZ2 assigned to the priority class PR2. Likewise, before transmission of a message assigned to the priority class PRn, a comparison of the counts of all input and output counters EZ1, AZ1-EZ (n−1), AZ (n−1) assigned to the higher-value priority classes PR1-PR (n−1) also occurs in addition to a comparison of the counts of the input and output counters EZn and AZn allocated to the lowest priority class. These sequences always occur during the processing times between two clock pulses of a module cycle. As described above with respect to FIG. 3, sufficient time for such operations are possible. The count comparisons can be executed with the procedures usually provided for microprocessors with little difficulty and are readily achieved by those skilled in the art.

The arrangement described offers advantages above all for a switching system operating for storage and forward switching. However, a character-wise transmission of messages can also be executed, i.e. the system can also be employed as a circuit switch. To such end, a further time period is provided in each module cycle during which a respective microprocessor is connected to the common data bus for character-wise transmission. Corresponding to the speeds attainable with the employment of known microprocessors, a time duration of 2μ is sufficient for a connection. For example, for 20 simultaneously existing circuit switching connections, there then occurs a duration of 40μ for the time period with a sequence of, for example, 24 ms determined by means of the module cycle.

Each of the components described herein are "off-the-shelf" items which can be readily purchased from various manufacturers such as Intel Corporation or Siemens Offenlegungsschrift. A detailed description of such components may be found in the Siemens Data Book 1976/76 "Microprocessor Modules"—System SAB 8080, which corresponds in content to a similar publication in the United States of Intel Corporation. The following is a schedule of such components using the Siemens circuit designations

| | | |
|---|---|---|
| MC1-MC64 | Microprocessor | SAB8080 |
| DC | Decoder | SAB8205 C |
| DMA | Direct Access Memory | SAB8257 |
| P1-P8 | Buffer Storage Units | SAB8251 |
| T | Clock Pulse from Clock Pulse Unit | SAB8224 |
| MPR-ST | Microprocessor Control Unit | SAB8228 |
| PS | Program Memory REPROM | SAB8708 |
| AS | Address Memory RAM | SAB8107 and SAB8222 |
| US1-US8 | Telegraphic Signal Converter Unit | |

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a switching system having microprocessors operable in a transmitting mode to transmit data and in a receiving mode to receive data and communicating with each other over a data bus carrying information blocks including addresses, for decentralized execution of switch-oriented functions, comprising:

a plurality of connection lines each having a respective address and each representing a data transmission speed and adapted for connection to data transmission/receiving devices;

a plurality of processing devices each of which has a respective address and is operable to perform a predetermined function;

a plurality of microprocessors each autonomously operable with respect to its own functions, first ones of said microprocessors being in a network level and each connected to at least one of said connection lines, and second ones of said microprocessors being in a switching level and connected to respective ones of said processing devices;

a data bus connected to each of said microprocessors for carrying the information blocks including addresses identifying said connection lines and said processing devices; and a clock pulse bus connected to each of said microprocessors for carrying cyclically occurring clock pulses for rendering a respective microprocessor connected to said data bus and operable in a transmitting mode to transmit an information block and all other microprocessors simultaneously connected to said data bus and operable in a receiving mode to receive an information block, each of said microprocessors operable only in response to the address of the respective connection line or respective processing device connected thereto for receiving the information block containing the relevant address.

2. The circuit arrangement of claim 1, wherein:
said clock pulses for the respective microprocessors define a system cycle,
the recurrance times of said clock pulses define respective module cycles between adjacent clock pulses,
the number of module cycles being equal to the number of microprocessors, and
each of said microprocessors includes a module clock providing pulses for controlling interval microprocessor sequence of operations within the respective module cycle.

3. The circuit arrangement of claim 1, wherein:
each of said microprocessors includes a settable counter which is preset to a unique counter setting and in responsive to each clock pulse to advance in count; and
each of said microprocessors includes means for determining whether the microprocessor operates as a receiver in response to non-coincidence of the count of the counter and the preset count setting or as a transmitter in response to such coincidence.

4. The circuit arrangement of claim 1, wherein:
each of said microprocessors includes means storing the address of only the respective connection line or processing device connected thereto.

5. The circuit arrangement of claim 4, comprising:
an additional storage means connected to one of said second microprocessors and storing all of the addresses of the connection lines and processing devices, said one microprocessor including means operable to receive all information blocks transmitted on said data bus and operable during its module cycles to transmit information blocks on said data bus.

6. The circuit arrangement of claim 5, comprising:
means for rendering said one microprocessor operable as a transmitter and all other microprocessors operable as receivers in response to a predetermined clock pulse in any module cycle.

7. The circuit arrangement of claim 6, comprising:
means for providing priority switching of messages including, for each priority class provided at a microprocessor, an input counter means operable in response to an information block addressed to the microprocessor to add the count of said input counter to the address and increase the count by one, an output counter, and means for comparing the counter readings of said input and output counters and causing transmission of the message in response to coincidence and an increase of the output counter by one.

8. The circuit arrangement of claim 7, for priority service, comprising:
means receiving the information blocks from said data bus and operable to cause, for each priority class lower than the highest priority class, a comparison of the counts of the input and output counters of each higher priority class before causing transmission of a message for the relevant priority class.

* * * * *